US012521842B2

(12) United States Patent
Wang et al.

(10) Patent No.: US 12,521,842 B2
(45) Date of Patent: Jan. 13, 2026

(54) ADAPTIVE VIBRATION AMPLITUDE FOR IMPACT GRINDING OF CERAMIC MATRIX COMPOSITE COMPONENTS

(71) Applicant: Raytheon Technologies Corporation, Farmington, CT (US)

(72) Inventors: Zhigang Wang, South Windsor, CT (US); Andrzej E. Kuczek, Bristol, CT (US); Robin H. Fernandez, East Haddam, CT (US); John D. Riehl, Hebron, CT (US); Alan C. Barron, Jupiter, FL (US); John Henry Shaw, West Hartford, CT (US); Evan B. Callaway, Santa Barbara, CA (US); Cheng Gao, South Glastonbury, CT (US)

(73) Assignee: RTX Corporation, Farmington, CT (US)

( * ) Notice: Subject to any disclaimer, the term of this patent is extended or adjusted under 35 U.S.C. 154(b) by 417 days.

(21) Appl. No.: 17/993,342

(22) Filed: Nov. 23, 2022

(65) Prior Publication Data

US 2024/0165764 A1    May 23, 2024

(51) Int. Cl.
*B24B 49/16* (2006.01)
*B23Q 17/09* (2006.01)
(Continued)

(52) U.S. Cl.
CPC .......... *B24B 49/16* (2013.01); *B23Q 17/0952* (2013.01); *B24B 1/04* (2013.01); *G05B 19/18* (2013.01); *G05B 2219/45206* (2013.01)

(58) Field of Classification Search
CPC .. B24B 49/16; B24B 1/00; B24B 1/04; B23Q 17/00; B23Q 17/09; B23Q 17/0952;
(Continued)

(56) References Cited

U.S. PATENT DOCUMENTS 5,101,599 A * 4/1992 Takabayasi ........... B06B 1/0261
451/910
10,678,219 B2  6/2020 Ketelaer et al.
(Continued)

FOREIGN PATENT DOCUMENTS

CN    109108317 A    1/2019
CN    110281087 B    6/2021
(Continued)

OTHER PUBLICATIONS

European Search Report for EP Application No. 23210856.3 dated Mar. 19, 2024.

*Primary Examiner* — C. A. Rivera
(74) *Attorney, Agent, or Firm* — Carlson, Gaskey & Olds, P.C.

(57) ABSTRACT

A method of machining ceramic matrix composite components includes providing an ultrasonic vibration tool having a tool tip, and exciting the tool by providing a control current, such that the tool tip is repeatedly vibrated towards and away from a ceramic matrix composite workpiece. A slurry feed is supplied including abrasive particles to a surface to be machined by the tool tip. A vibration amplitude of the tool tip is controlled by sensing load on the tool and communicating with a computing device. The computing device controls the vibration amplitude of the tool tip. The computing device is provided with at least one memory programmed with historic data, and is operable to modify the vibration amplitude signal being sent to the tool, and comparing resulting load levels due to the change in vibration amplitude signals, and storing the change in vibration amplitude signals at the memory.

17 Claims, 7 Drawing Sheets

(51) Int. Cl.
*B24B 1/04* (2006.01)
*G05B 19/18* (2006.01)

(58) Field of Classification Search
CPC ........ G05B 13/00; G05B 13/04; G05B 19/18; G05B 2219/45206
See application file for complete search history.

(56) References Cited

U.S. PATENT DOCUMENTS

| | | |
|---|---|---|
| 2009/0198369 A1 | 8/2009 | Xu et al. |
| 2011/0003535 A1* | 1/2011 | Perez-Duarte ........ B24B 19/009 451/36 |
| 2018/0039255 A1* | 2/2018 | Ketelaer .............. B23Q 15/013 |
| 2021/0299901 A1 | 9/2021 | Xu et al. |
| 2021/0356934 A1* | 11/2021 | Krishna ................... G01N 3/58 |
| 2022/0152770 A1 | 5/2022 | Chen et al. |

FOREIGN PATENT DOCUMENTS

| | | | |
|---|---|---|---|
| CN | 111596549 B | 9/2022 | |
| DE | 102012219232 A1 * | 4/2014 | ............. B23B 37/00 |
| WO | 2012/158049 A1 | 11/2012 | |

\* cited by examiner

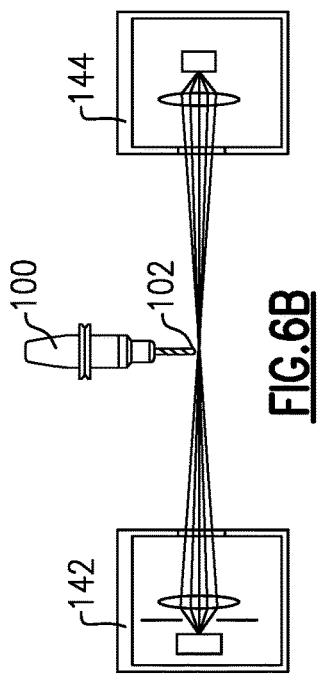
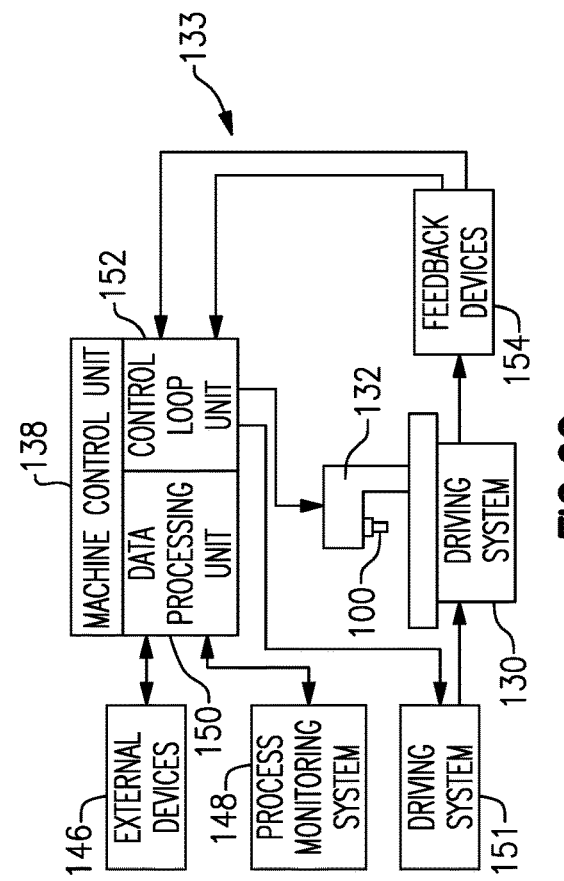
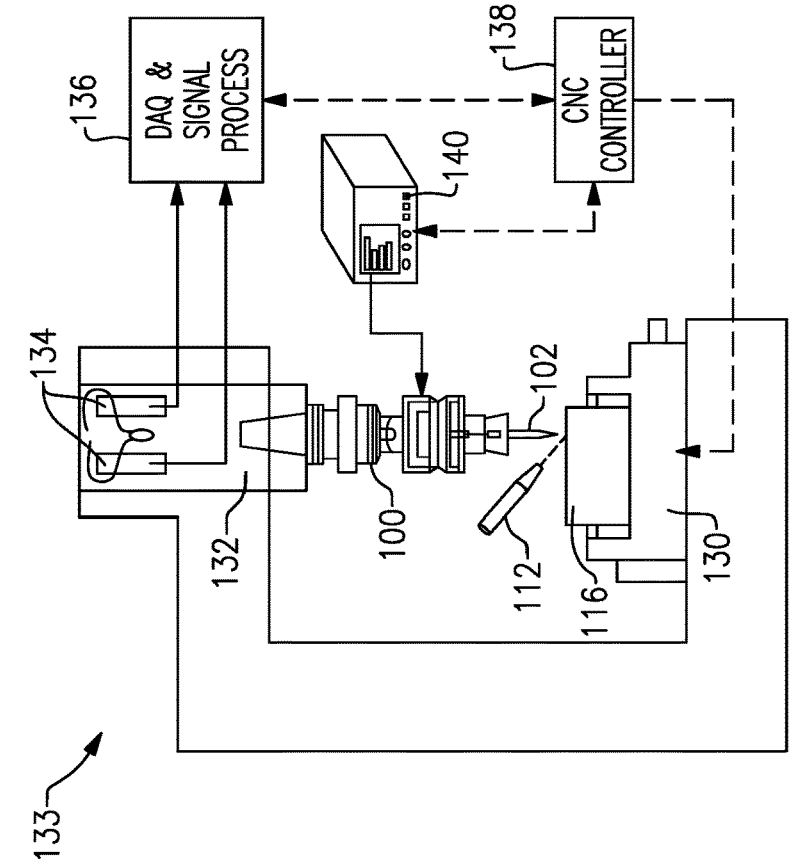
FIG. 6B
FIG. 6C
FIG. 6A

ADAPTIVE VIBRATION AMPLITUDE FOR IMPACT GRINDING OF CERAMIC MATRIX COMPOSITE COMPONENTS

BACKGROUND OF THE INVENTION

This application relates to a method of adaptive machining of ceramic matrix composite components utilizing ultrasonic impact grinding.

Gas turbine engines are known, and typically include a fan delivering air into a bypass duct as propulsion air. Air is also delivered into a compressor where it is compressed and then delivered into a combustor. In the combustor the compressed air is mixed with fuel and ignited. Products of combustion pass downstream over turbine rotors, driving them to rotate. Turbine rotors in turn drive a compressor and fan rotors.

The turbine section includes a number of components including static vanes, rotating blades, and blade outer air seals which are positioned outwardly of a rotating blade row. These components see very high temperatures from the products of combustion.

Components for use in the turbine section must be able to survive these very high temperatures. In the past a good deal of engineering has been directed to develop appropriate metals for the components.

More recently, ceramic matrix composite materials ("CMCs") have been proposed for forming components in the turbine section.

Ceramic matrix composite materials are also utilized in other applications. As such, the description of a gas turbine engine is simply to describe one application of their use.

SUMMARY OF THE INVENTION

In a featured embodiment, a method of machining ceramic matrix composite components includes providing an ultrasonic vibration tool having a tool tip, and exciting the tool by providing a control current, such that the tool tip is repeatedly vibrated towards and away from a ceramic matrix composite workpiece. A slurry feed is supplied including abrasive particles to a surface to be machined by the tool tip. A vibration amplitude of the tool tip is controlled by sensing load on the tool and communicating with a computing device. The computing device controls the vibration amplitude of the tool tip. The computing device is provided with at least one memory programmed with historic data, and is operable to modify the vibration amplitude signal being sent to the tool, and comparing resulting load levels due to the change in vibration amplitude signals, and storing the change in vibration amplitude signals at the memory.

In another embodiment according to the previous embodiment, the ceramic matrix composite workpiece includes areas with fabric tows, areas with matrix, and areas of porosity and modifying the vibration amplitude dependent upon what particular area is being machined by the tool tip.

In another embodiment according to any of the previous embodiments, larger vibration amplitudes are utilized at areas with fabric tows, and smaller vibration amplitudes are utilized at areas with matrix or porosity.

In another embodiment according to any of the previous embodiments, a condition of the tool tip is checked, and the tool is replaced if the condition indicates replacement is in order.

In another embodiment according to any of the previous embodiments, the condition of the tool tip is checked if sensed load levels are higher than desired.

In another embodiment according to any of the previous embodiments, a length of the tool tip is checked using a laser.

In another embodiment according to any of the previous embodiments, the historic data includes input parameters including material properties of the ceramic matrix composite workpiece and tool geometries.

In another embodiment according to any of the previous embodiments, the control includes a physics based model that utilizes the input parameters to estimate a cutting force, with the cutting force being stored at the memory.

In another embodiment according to any of the previous embodiments, the physics based model is also utilized to estimate a vibration amplitude which is sent to a power control for controlling the tool to achieve a desired vibration amplitude.

In another embodiment according to any of the previous embodiments, the computing device determines process optimization based upon machine learning and communicates the process optimization back to the physics based model.

In another embodiment according to any of the previous embodiments, the workpiece is moved with a machine table, and the computing device receives feedback of a position of the workpiece on the machine table.

In another featured embodiment, an ultrasonic vibration system includes an ultrasonic vibration tool including a tool tip and a transducer to cause vibration of the tool tip. A slurry feed is operable to supply a slurry with abrasive particles at a workpiece. A computing device controls a vibration amplitude of the tool tip. The computing device is provided with at least one memory programmed with historic data to determine an indicated vibration amplitude, and is operable to modify the vibration amplitude signal being sent to the tool, and comparing resulting load levels due to the change in vibration amplitudes, and using storing the modified vibration amplitude the memory.

In another embodiment according to any of the previous embodiments, larger vibration amplitudes are utilized at areas on a workpiece with fabric tows, and smaller vibration amplitudes are utilized at areas with matrix or porosity.

In another embodiment according to any of the previous embodiments, a tool condition monitor is included.

In another embodiment according to any of the previous embodiments, the condition of the tool tip is checked if sensed load levels are higher than desired.

In another embodiment according to any of the previous embodiments, a length of the tool tip is checked using a laser.

In another embodiment according to any of the previous embodiments, the historic data includes input parameters including material properties of a ceramic matrix composite workpiece and tool geometries.

In another embodiment according to any of the previous embodiments, the computing device includes a physics based model that utilizes the input parameters to estimate a cutting force, with the cutting force being stored at the memory.

In another embodiment according to any of the previous embodiments, the physics based model is also utilized to estimate a vibration amplitude which is sent to a power control for controlling the tool to achieve a desired vibration amplitude.

In another embodiment according to any of the previous embodiments, the computing device determines process optimization based upon machine learning and communicates the process optimization back to the physics based model.

The present disclosure may include any one or more of the individual features disclosed above and/or below alone or in any combination thereof.

These and other features of the present invention can be best understood from the following specification and drawings, the following of which is a brief description.

BRIEF DESCRIPTION OF THE DRAWINGS

FIG. 6A shows a machining station for performing an improved method for machining as illustrated in FIGS. 4C-4E.

FIG. 6B shows a related portion of the machining station of FIG. 6A.

FIG. 6C shows a schematic view of a station such as shown in FIG. 6A.

DETAILED DESCRIPTION

Figure 1:
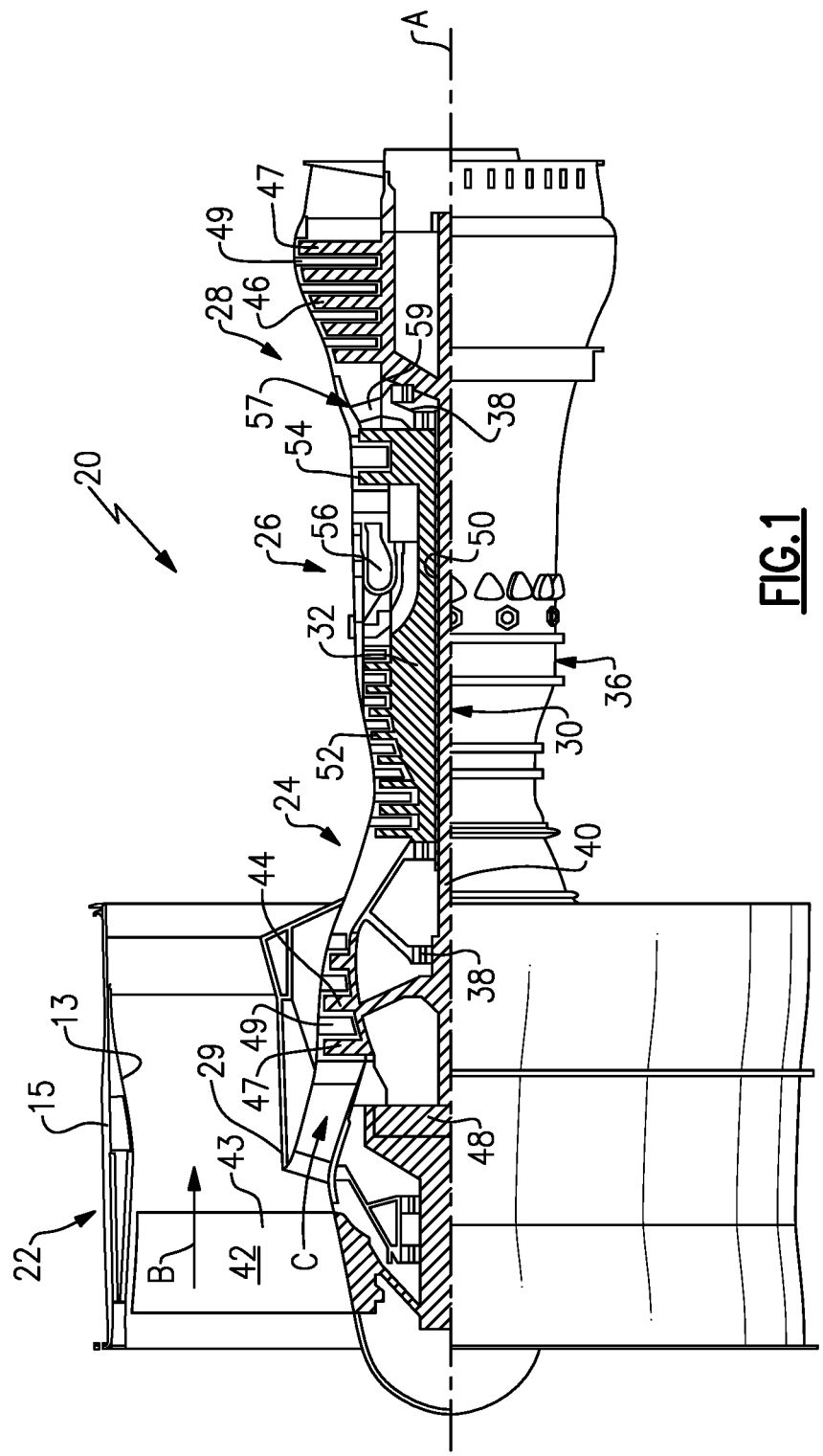
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 may include a single-stage fan 42 having a plurality of fan blades 43. The fan blades 43 may have a fixed stagger angle or may have a variable pitch to direct incoming airflow from an engine inlet. The fan 42 drives air along a bypass flow path B in a bypass duct 13 defined within a housing 15 such as a fan case or nacelle, and also drives air along a core flow path C for compression and communication into the combustor section 26 then expansion through the turbine section 28. A splitter 29 aft of the fan 42 divides the air between the bypass flow path B and the core flow path C. The housing 15 may surround the fan 42 to establish an outer diameter of the bypass duct 13. The splitter 29 may establish an inner diameter of the bypass duct 13. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures. The engine 20 may incorporate a variable area nozzle for varying an exit area of the bypass flow path B and/or a thrust reverser for generating reverse thrust.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in the exemplary gas turbine engine 20 is illustrated as a geared architecture 48 to drive the fan 42 at a lower speed than the low speed spool 30. The inner shaft 40 may interconnect the low pressure compressor 44 and low pressure turbine 46 such that the low pressure compressor 44 and low pressure turbine 46 are rotatable at a common speed and in a common direction. In other embodiments, the low pressure turbine 46 drives both the fan 42 and low pressure compressor 44 through the geared architecture 48 such that the fan 42 and low pressure compressor 44 are rotatable at a common speed. Although this application discloses geared architecture 48, its teaching may benefit direct drive engines having no geared architecture. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

Airflow in the core flow path C is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core flow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The low pressure compressor 44, high pressure compressor 52, high pressure turbine 54 and low pressure turbine 46 each include one or more stages having a row of rotatable airfoils. Each stage may include a row of vanes adjacent the rotatable airfoils. The rotatable airfoils are schematically indicated at 47, and the vanes are schematically indicated at 49.

Figure 2:
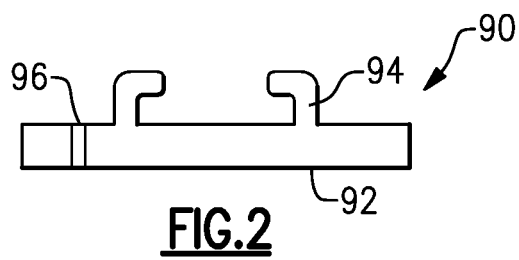
FIG. 2 shows a component in a turbine section of the FIG. 1 engine.

FIG. 2 schematically shows a component which may be used in a gas turbine engine turbine section. As illustrated in FIG. 2, the component 90 is a blade outer air seal having an inner face 92 which would be radially spaced close to an outer tip of a rotating turbine blade. Hooks 94 will mount the blade outer air seal into the turbine section. As shown, a cooling hole 96 may extend through the blade outer air seal.

The blade outer air seal 90 may be formed of ceramic matrix composite materials ("CMCs"). CMCs may also be used for static turbine vanes and turbine blades. CMCs are also used for other applications outside turbine engines. All of these items may benefit from this disclosure.

Such components may be formed of CMC material. A CMC material is comprised of one or more ceramic fiber plies in a ceramic matrix. Example ceramic matrices are silicon-containing ceramic, such as but not limited to, a silicon carbide (SiC) matrix or a silicon nitride (Si3N4) matrix. Example ceramic reinforcement of the CMC are silicon-containing ceramic fibers, such as but not limited to, silicon carbide (SiC) fiber or silicon nitride (Si3N4) fibers. The CMC may be, but is not limited to, a SiC/SiC ceramic matrix composite in which SiC fiber plies are disposed within a SiC matrix. A fiber ply has a fiber architecture, which refers to an ordered arrangement of the fiber tows relative to one another, such as a 2D woven ply or a 3D structure.

Figure 3:
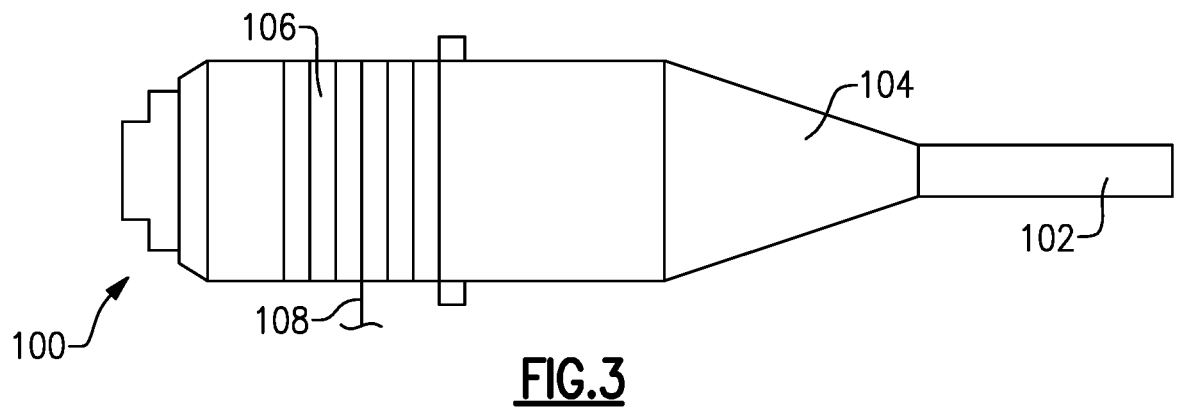
FIG. 3 shows a tool for machining the FIG. 2 component.

It is known to machine a CMC component such as to form holes 96, or slots, etc. utilizing an ultrasonic impact grinding tool such as shown in FIG. 3. Tool 100 includes a tool tip 102, a step horn 104 that will focus vibrations onto the tool tip 102 and a transducer 106 which takes in control signals at 108 to control a vibration amplitude of the tool tip 102.

Electric energy is supplied to the transducer 106, and converted to mechanical vibration along the longitudinal axis of the tool tip 102 at high frequency (say 20-40 kHz). Higher supplied electric energy increases a vibration amplitude. The excited vibrations are subsequently transmitted through an energy focus horn 104 to amplify the vibration amplitude and is finally delivered to the tool tip 102. The tool tip 102 is located above a workpiece and can vibrate along this longitudinal axis with a desired amplitude.

Figure 4B:
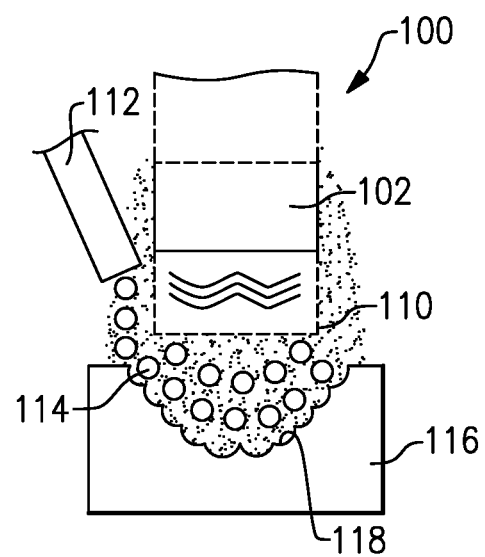
FIG. 4B shows machining the FIG. 4A component.
Figure 4A:
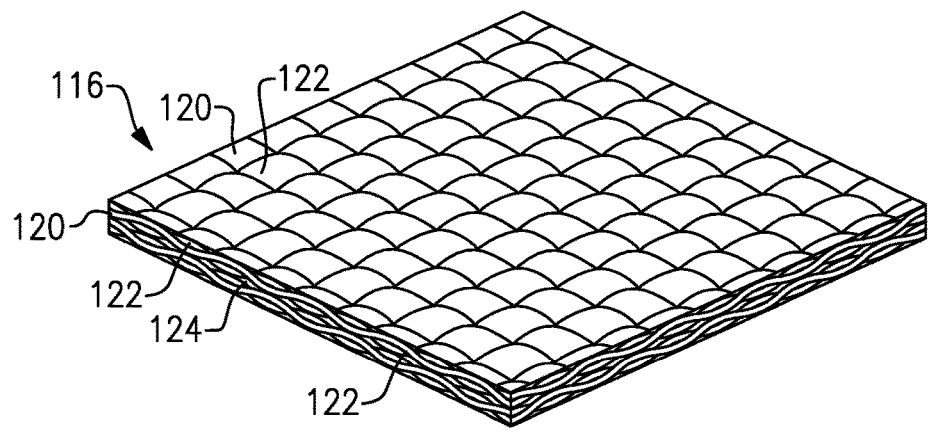
FIG. 4A shows a detail of the FIG. 2 component.

FIG. 4A shows a detail of a workpiece or intermediate product 116, which may be an intermediate product being machined to form the blade outer air seal 90 of FIG. 2.

Notably, while a blade outer air seal is disclosed, the teaching of this disclosure, and the use of the CMC apply equally to static vanes, turbine blades and components for applications other than gas turbine engines.

The intermediate product 116 is shown having fiber tows 120 and 122 which are formed of a CMC fiber, and are interwoven. There are also areas including a CMC matrix such as shown at 124, and also pores or voids in the matrix.

Such woven reinforced materials as illustrated for component 116 could be said to be characterized by three different constituents, fibers, matrix and pores. Due to the complex manufacturing method followed, and when being densified such as by chemical vapor infiltration, the porosity formed into the component can be high.

FIG. 4B schematically shows a machining of the component 116 using a tool such as tool 100. As shown, the tool tip 102 is vibrated toward and away from the surface of the component 116, and is shown in phantom at 110. During this movement a slurry source 112 supplies a slurry. As shown, the slurry includes abrasive particles 114. The vibration in combination with the abrasive particles machines away the component 116 such as shown at 118.

The abrasive slurry is generally a mixture of abrasive material, e.g., diamond, boron carbide, etc. suspended in water or oil. It is provided constantly into the machining area which flushes debris away from the work zone. The vibration of the tool causes the abrasive particles held in the slurry between the tool and the workpiece to impact the workpiece surface causing material removal by microchipping as shown in FIG. 4B. Since the actual machining is carried out by abrasive particles, the tool can be softer than the workpiece.

Figures 4C, 4D, 4E:
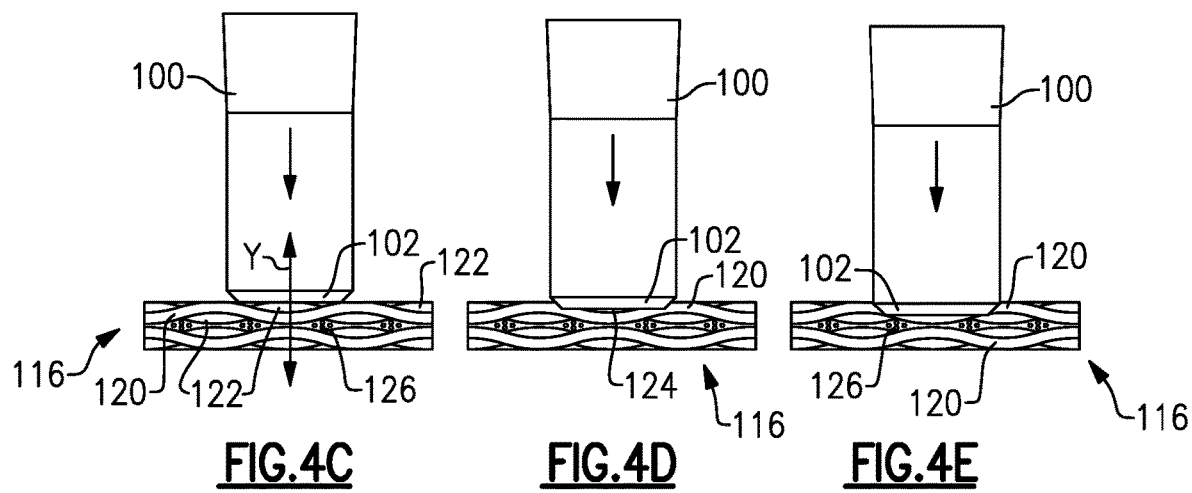
FIG. 4C shows a step in machining the FIG. 4A component.
FIG. 4D shows a subsequent step in machining the FIG. 4A component.
FIG. 4E shows another subsequent step.

As shown in FIG. 4C, as the component 116 is being machined, the tool tip 102 may initially encounter a tow 122. One can appreciate that the relative content of the tows 120/122 (fibers), matrix and porosity is changing along a hole axis Y. It may also vary depending on where the hole is machined. It should be understood that typically more than one hole is machined into a component, and there would be variation between the content of the component at the distinct area. As an example, directly to the left of where the hole is being drilled in FIG. 4C the respective materials would differ in order.

As shown in FIG. 4D, the tool tip 102 is now encountering a tow 120, with a slight bit of matrix 124 having porosity.

FIG. 4E shows a subsequent step wherein the tool is now machined through the tow 120 and is again encountering matrix and porosity at 126.

In a subsequent step the tool will have moved through the area 126 of matrix with porosities and will again encounter another tow portion 120.

The fracture characteristics of the matrix is relatively uniform, but the fiber fracture characteristics will vary based upon fiber orientation and density. Typically, the fibers are initially debonded from the matrix and then bending-induced fracture, compression-induced fracture and sheer-induced fracture occur in different orientations of the fibers.

Figure 5:
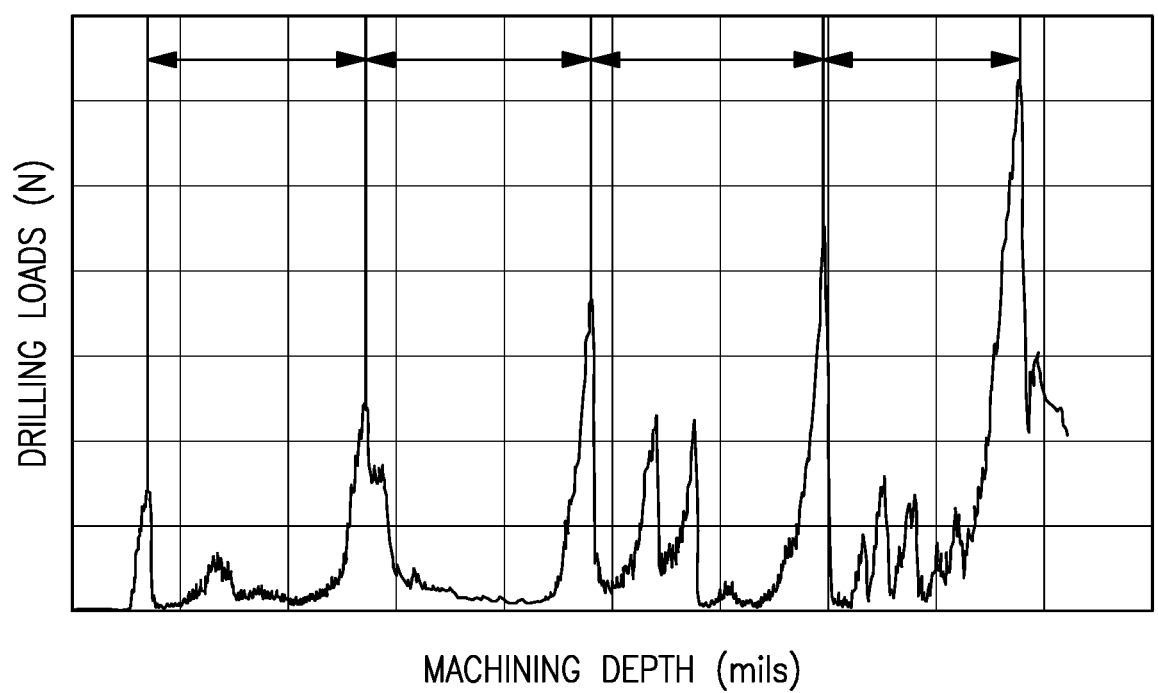
FIG. 5 is a graph showing the relationship between the machining depth and drilling load for a machining operation such as illustrated in FIG. 4C-4E.

The result of all this variation may be appreciated in FIG. 5 which illustrates the drilling load on the tool 100 with the machining depth through the thickness of the component 116 across the steps illustrated in FIGS. 4C-4E, as examples.

As shown in FIG. 5, a peak load occurs early on in the machining depth. This correlates to the depth of a plie, and the pattern is repeated. The fluctuating loads are not desirable for creating precision features and can cause overloading of the tooling in some cases. Thus, it would be desirable to utilize adaptive control of the loads to improve the process efficiency.

The result of this variation is that the machining time is not as efficient as would be desirable in that the vibration levels must be controlled to avoid the drilling load exceeding a pre-determined maximum. This may cause areas of lower concern, such as a matrix/void rich area to have reduced vibration amplitudes then might be otherwise available. That is to say the fluctuating loads such as illustrated in FIG. 5 can be challenging for creating precision features and may cause overloading of the tool 100 in some cases.

Applicant has recognized that adaptive control of the machining process would be desirable.

Previous studies show that machining speed mainly depends on the vibration amplitude, applied static pressure, abrasive concentration, and size distribution of the abrasive particles. In practice, once the slurry solution is selected in use, mainly only the vibration amplitude and applied static pressure can be adjusted to achieve the desired material removal. Therefore, Applicant has recognized it would be desirable to develop a machining strategy to meet targeted requirement.

Woven reinforced materials such as CMCs can be characterized by three different constituents: fibers, matrix, and porosities. Particularly in CMCs, due to the complex manufacturing method followed, and especially during the densification stage by Chemical Vapor Infiltration (CVI), big porosities can be found within the material and therefore, which need to be considered to get an in-depth understanding of the cutting mechanism. A typical microstructure of a woven CMC material, has plies with fiber-rich areas (warps and wefts), matrix-rich areas and porosities. Accordingly, CVI CMC structure can be characterized by the fiber-rich region, matrix-rich region and porosities, and their relative content can be expressed as:

$$C_{CMC}=C_{fiber}+C_{matrix}+C_{porosity}=1 \qquad 1)$$

As shown in FIGS. 4C-E, the relative content of fiber, matrix and porosity is changing along the hole axis, and it also varies depending on where the hole is machined. Therefore, two stochastic variables are defined to describe the structure of the material; the relative content of fiber is defined as λ while the relative content of matrix as v. Hence, the total relative content of material at a specific instant of the drilling process (t) or drilling depth (d) for a certain size of a tool (s) can be defined as:

$$C_{CMC}(s,t)=C_{fiber}+C_{matrix}+C_{porosity}=\lambda+v+(1-\lambda-v) \qquad 2)$$

It is therefore clear that, depending on how the material is distributed along the drilling path, the tool might encounter different resultant axial loads. Due to the stochastic nature of λ and v, a probabilistic approach defining how the resultant cutting load tends to fluctuate depending on the cutting depth (d), can offer an understanding of how the heterogeneous material property affects the level of dynamics of the system.

Based on Eq. (2), a vibration amplitude profile can be estimated to overcome nonuniform fracture toughness along the drilling path, smaller vibration amplitude may be used for regions with higher ratio of pores, and larger vibration amplitude for regions with high concentration ratio of fiber tows. This estimated amplitude will then be used as a reference for adaptive process control.

During an actual drilling process, the load sensor signals are used to control the tool speed to maintain the prescribed loads as mentioned above. For the conventional way of feed rate scheduling, where the feed rates are adjusted proportionally to the cutting loads, significantly reduced feed rates happen when high loads occurred, which consequently cause great reduction of productivity.

So, the novelty here is to adaptively control the vibration amplitude by increasing power to the ultrasonic system to overcome higher fracture toughness for areas with high concentration ratio of fiber tows. If the actual feed rate is within a reasonable range, the process continues until the end of the program. On the other hand, if the feed rate is out of the normal range even with higher vibration amplitude, the on-machine tool measurement is then used to check tool length and diameter. The difference between the tool penetration depth and tool wear is the actual machining rate.

If the observed machining rate is significantly less than the desired one, one needs to either replace the tooling or flush used slurry out of machining area.

FIG. 6A shows a system 133 for performing the machining. As shown, the tool 100 is associated with the slurry nozzle 112. A workpiece 116 is mounted on a machine table 130. A machine mount 132 connects the tool 100 to load sensors 134. The load sensors may alternatively be associated with a work holder.

A data acquisition and signal processing component 136 receives signals from the load sensors 134 and communicates with a machine controller 138. The machine controller 138 also communicates with an ultrasonic power supply 140 for controlling the vibration amplitude of the tool tip 102.

FIG. 6B shows another feature of the system 133. As shown, a system for monitoring the amount of wear on the tool tip 102 may include a laser diode and optics are in component 142 for sending a laser signal across the tool tip 102 to be received by a receiver 144. This allows the system to check the length of the tool tip 102 and determine if replacement or repair is in order.

FIG. 6C is another view of the main operational areas of the system 133 including the machine table 130, the tool 100 and mount 132. In addition, the control unit 138 includes a data processing unit 150 and a control loop unit 152. Feedback devices 154 communicate with the control loop unit 152 and from the machine table 130. A driving system 151 may drive the machine table 130 to change the location of the workpiece relative to the tool 100. The driving system 150 and tool 100 receives signals from the control unit 152, in part based upon the feedback position signals from the feedback devices 154. A process monitoring unit 148 communicates with the data processing unit 150.

External devices 146 communicate to and from the machine control unit 138. Examples of external devices might be the tool change device of FIG. 6B, a coolant supply, human machine interfaces, etc.

The load signals on the tool 100 or on the work holder, is captured (sensors 134) during machining and is used to maintain desired loads on the tool. Based upon position data feedback the actual motion along a tool axis can be obtained. With real time data obtained during machining it is possible to perform closed-loop process control of the machining operation to achieve targeted machining performance.

The power supply 140 is controlled adaptively to provide a targeted power to the ultrasonic tool to achieve desired vibration amplitude as the material content of the component 116 changes.

Figure 7:
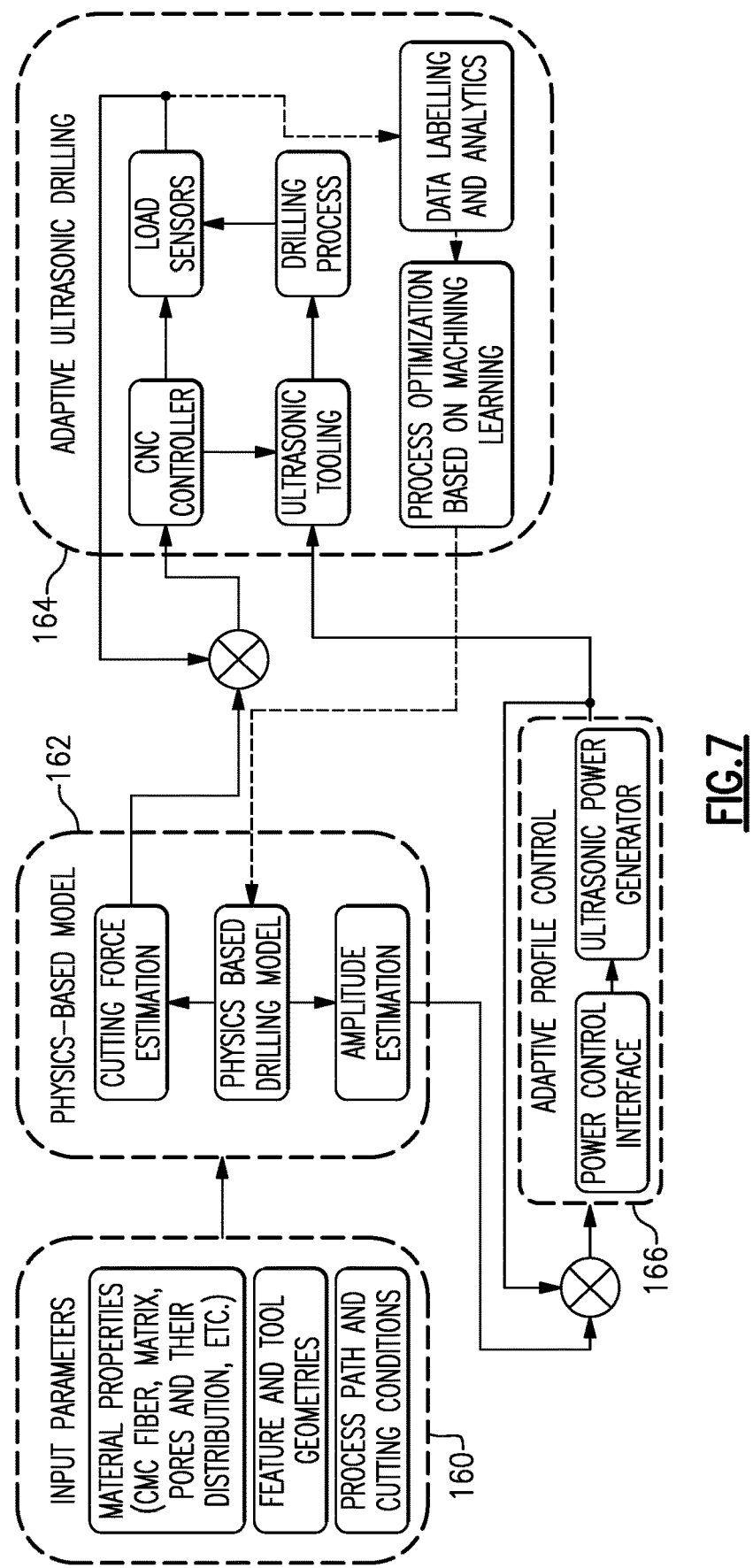
FIG. 7 is a schematic of the interrelated controls as utilized with the FIG. 6A station.

A process flow chart is shown in FIG. 7 including input parameters 160, a physics-based model 162, adaptive profile control 166 and an adaptive ultrasonic drilling system 164.

At first, input parameters such as fracture toughness of the fiber tow and matrix, ratios of the fiber tow matrix and pores in a part to be machined are found. Tow depth, tooling geometries and machining conditions are also input parameters 160.

If some of the input parameters are unknown it may be necessary to perform tests to calibrate the loads so that an estimated load profile can be obtained as a reference for the real time process control.

The physics based model 162 can be used to predict a load profile along a drill axis depth initially based upon the input parameters.

The control includes a physics based model that utilizes the input parameters to estimate a cutting force, with the cutting force being utilized at an adaptive ultrasonic control.

The physics based model is also utilized to estimate a vibration amplitude which is sent to a power control for controlling the tool to achieve a desired vibration amplitude.

Ideally, a larger vibration amplitude can be used to effectively break the fiber tow during drilling. Based upon the input parameters a vibration amplitude profile can be estimated to overcome non-uniform fracture toughness along the drilling path. A smaller vibration amplitude may be utilized for regions of higher ratio of pores, and a larger vibration amplitude may be utilized for regions of higher concentration of fiber tows. By utilizing larger vibration amplitude, the speed of machining of those areas can be increased.

The estimated amplitude can then be used as a reference for an adaptive process control. During actual machining, the load sensor signals are used to control tool speed to maintain prescribed loads as mentioned above.

For the conventional way of machining, feed rates adjust in proportion to the cutting loads. This could significantly reduce the feed rate in some applications when high loads occur. This results in loss of efficiency.

By utilizing adaptive control, the vibration amplitude can be controlled by increasing power to the tool 100 to overcome higher fracture toughness for areas with high concentration of fiber tows. If the actual feed rate is within a reasonable range, the process may continue until the end.

On the other hand, if the feed rate is out of normal even with a high vibration amplitude then the machine tool measurement as described in FIG. 6B may be utilized to check tool length or diameter. The different between tool penetration depth and tool wear is an actual machining rate.

If the observed machining rate is less than desired it may be necessary to replace the tooling or flush used slurry out of the machining area.

When the cutter is not engaged in tooling a power supply may be turned off to save energy. With encoder signals from the CNC controller, a tool position is known so the tool can also be slowed down during the breakthrough of holes to avoid edge chipping.

During processing all process data including machine conditions, reference and actual loads and amplitude profiles are saved and analyzed. If the target process performance is achieved to meet the quality inspection requirements of parts, the reference process signal and measured ones will be fused as an adjusted baseline signature which is then saved to the historic database.

In the drilling of subsequent parts, the adjusted baseline signature will be used for process monitoring control and by following the same procedures used to machine the previous parts. This adaptive process will be repeated until all parts are machined.

Over time with the physics guided machine learning, a reliable historic database can be built up as an up to date representation of the physical operation. Thus, a process profile is built on and continually improved. This is utilized to evaluate current machining and to predict future behavior, refine the control and optimize operations.

Figure 8:
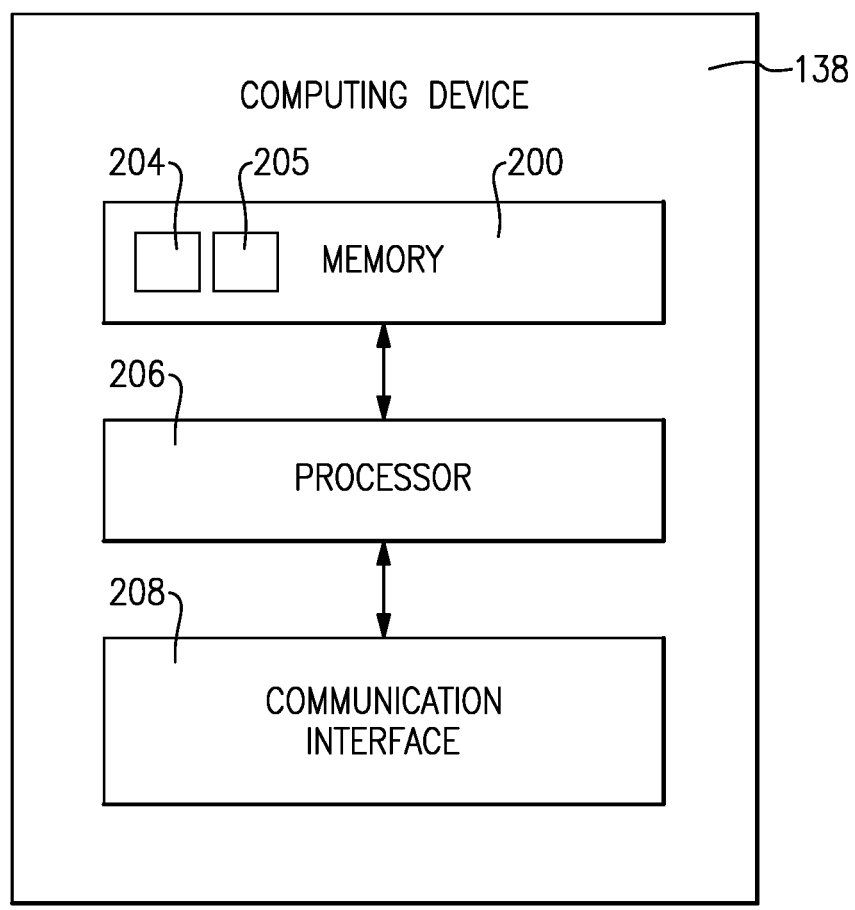
FIG. 8 discloses a control which may be incorporated into the FIG. 6A system and to work with the several functions illustrated in FIG. 7.

FIG. 8 shows details of the controller 138. The controller 138 includes a communication interface 208 to communicate with the sensors 134, receive position updates, etc. The processor 206 communicates with the communication interface 208 and does the computing associated with this method as will be described.

Memory 200 includes one or more neural networks 204 and 205. The neural networks are initially trained. As an example, historic data such as the input parameters 160 may be trained to the neural networks. However, the neural networks are operable to continue to learn, and to modify the vibration amplitudes resulting from the continued change. That is, the neural networks 204 and 205 are operable.

As the memory 200 learns the result of these changes, its initial operation is updated to the most favorable resulting machining times and load levels.

Memory 200 may have architecture other than the neural networks in other embodiments.

A method of machining ceramic matrix composite components under this disclosure could be said to include providing an ultrasonic vibration tool having a tool tip, and exciting the tool by providing a control current, such that the tool tip is repeatedly vibrated towards and away from a ceramic matrix composite workpiece. A slurry feed is supplied including abrasive particles to a surface to be machined by the tool tip, and controlling a vibration amplitude of the tool tip by sensing load on the tool and communicating with a computing device. The computing device controls the vibration amplitude of the tool tip. The computing device is provided with at least one memory programmed with historic data, and is operable to modify the vibration amplitude signal being sent to the tool, and compares resulting load levels due to the change in vibration amplitude signals, and stores the change in load levels at the memory.

An ultrasonic vibration system under this disclosure could be said to include an ultrasonic vibration tool including a tool tip and a transducer to cause vibration of said tool tip. A slurry feed operable to supply a slurry with abrasive particles at a workpiece. A computing device controls a vibration amplitude of the tool tip. The computing device is provided with at least one memory programmed with historic data to determine an indicated vibration amplitude, and is operable to modify parameters of the vibration amplitude signal being sent to the tool, and compares resulting load levels due to the change in vibration amplitudes, and uses the change in load levels at said memory.

Although embodiments have been disclosed, a worker of ordinary skill in this art would recognize that certain modifications would come within the scope of this disclosure. For that reason, the following claims should be studied to determine the true scope and content of this disclosure.

What is claimed is:

1. A method of machining ceramic matrix composite components comprising:
   providing an ultrasonic vibration tool having a tool tip, and exciting the tool by providing a control current, such that the tool tip is repeatedly vibrated towards and away from a ceramic matrix composite workpiece;
   supplying a slurry feed including abrasive particles to a surface to be machined by the tool tip, and controlling a vibration amplitude of the tool tip by sensing load on the tool and communicating with a computing device, said computing device controlling the vibration amplitude of the tool tip;
   said computing device provided with at least one memory programmed with historic data, wherein the historic data comprises tool geometries and material properties of the ceramic matrix composite workpiece including areas with fabric tows, areas with matrix, and areas of porosity;
   comparing resulting load levels due to a change in vibration amplitudes;
   storing said change in vibration amplitudes at said memory; and
   modifying the vibration amplitude dependent upon the historic data and what particular area is being machined by the tool tip such that larger vibration amplitudes are utilized at areas with fabric tows, and smaller vibration amplitudes are utilized at areas with matrix or porosity.

2. The method as set forth in claim 1, wherein a condition of the tool tip is checked, and the tool is replaced if the condition indicates replacement is in order.

3. The method as set forth in claim 2, wherein the condition of the tool tip is checked if sensed load levels are higher than desired.

4. The method as set forth in claim 3, wherein a length of the tool tip is checked using a laser.

5. The method as set forth in claim 1, wherein the control includes a physics based model that utilizes the input parameters to estimate a cutting force, with the cutting force being stored at the memory.

6. The method as set forth in claim 5, wherein the physics based model is also utilized to estimate a vibration amplitude which is sent to a power control for controlling the tool to achieve a desired vibration amplitude.

7. The method as set forth in claim 6, wherein the computing device determines process optimization based upon machine learning and communicates the process optimization back to the physics based model.

8. The method as set forth in claim 1, wherein the workpiece is moved with a machine table, and the computing device receiving feedback of a position of the workpiece on the machine table.

9. An ultrasonic vibration system comprising:
an ultrasonic vibration tool including a tool tip and a transducer to cause vibration of said tool tip;
a slurry feed operable to supply a slurry with abrasive particles at a workpiece; and
a computing device controlling a vibration amplitude of the tool tip, and said computing device provided with at least one memory programmed with historic data comprising tool geometries and material properties of the ceramic matrix composite workpiece including areas with fabric tows, areas with matrix, and areas of porosity, to determine an indicated vibration amplitude,
the computing device is configured to
compare resulting load levels due to a change in vibration amplitudes,
store said change in vibration amplitudes in said memory; and
modify the vibration amplitude dependent upon the historic data and what particular area is being machined by the tool tip such that larger vibration amplitudes are utilized at areas with fabric tows, and smaller vibration amplitudes are utilized at areas with matrix or porosity.

10. The system as set forth in claim 9, wherein a tool condition monitor is included.

11. The system as set forth in claim 10, wherein the condition of the tool tip is checked if sensed load levels are higher than desired.

12. The system as set forth in claim 11, wherein a length of the tool tip is checked using a laser.

13. The system as set forth in claim 9, wherein the computing device includes a physics based model that utilizes the input parameters to estimate a cutting force, with the cutting force being stored at the memory.

14. The system as set forth in claim 13, wherein the physics based model is also utilized to estimate a vibration amplitude which is sent to a power control for controlling the tool to achieve a desired vibration amplitude.

15. The system as set forth in claim 14, wherein the computing device determines process optimization based upon machine learning and communicates the process optimization back to the physics based model.

16. The method as set forth in claim 1, wherein during the exciting the tool step, the supplying a slurry feed step, the comparing resulting load levels step, and the storing said change in vibration amplitude signals step;
machine conditions, reference and actual loads, and amplitude profiles are saved and analyzed, and are utilized in drilling of a subsequent part, with an adjusted baseline signature used for the subsequent parts.

17. The system as set forth in claim 9, wherein machine conditions, reference and actual loads, and amplitude profiles are saved and analyzed, and are utilized in drilling of a subsequent part, with an adjusted baseline signature used for the subsequent parts.

* * * * *